United States Patent [19]

Sarig et al.

[11] Patent Number: 4,530,278
[45] Date of Patent: Jul. 23, 1985

[54] APPARATUS FOR SEPARATING POMEGRANATE SEEDS, SCANNING APPARATUS AND TECHNIQUES USEFUL IN CONNECTION THEREWITH AND STORAGE AND PACKAGING TECHNIQUES FOR SEPARATED SEEDS

[75] Inventors: Yoav Sarig, Ra'anana; Yitzhak Regev, Tel Aviv; Friedrich Grosz, Holon, all of Israel

[73] Assignee: State of Israel-Ministry of Agriculture, Beit Dagan, Israel

[21] Appl. No.: 438,346

[22] Filed: Nov. 1, 1982

[30] Foreign Application Priority Data

Jan. 5, 1982 [IL] Israel ................................. 64710

[51] Int. Cl.³ .............................................. A23N 4/00
[52] U.S. Cl. .......................................... 99/547; 99/514; 99/538; 99/567; 99/584
[58] Field of Search ................. 99/485, 486, 495, 496, 99/516, 534, 536, 514, 542–545, 547, 538, 552, 555, 562, 563, 567, 584; 426/484, 485

[56] References Cited

U.S. PATENT DOCUMENTS

| | | | |
|---|---|---|---|
| 1,901,042 | 3/1933 | Robbins | 99/563 |
| 1,982,742 | 12/1934 | Keenan | 99/495 X |
| 2,673,583 | 3/1954 | Skog | 99/563 X |
| 4,300,448 | 11/1981 | Hayashi et al. | 99/584 X |

*Primary Examiner*—Timothy F. Simone
*Attorney, Agent, or Firm*—Cushman, Darby & Cushman

[57] ABSTRACT

Apparatus for mechanical separation of the seeds of pomegranates or similar produce comprising a gas jet directed on the portion of the produce to be separated for effecting the separation desired. In particular, such apparatus comprising apparatus for exposing the interior of the produce, apparatus for supporting the produce such that its interior is exposed, and a gas jet arranged so as to direct a flow of pressurized gas against the exposed interior of the produce thereby effecting the desired separation.

4 Claims, 5 Drawing Figures

APPARATUS FOR SEPARATING POMEGRANATE SEEDS, SCANNING APPARATUS AND TECHNIQUES USEFUL IN CONNECTION THEREWITH AND STORAGE AND PACKAGING TECHNIQUES FOR SEPARATED SEEDS

FIELD OF THE INVENTION

The present invention relates to apparatus and techniques for preparing fresh produce to render it in ready-to-eat form and to scanning apparatus suitable for this purpose and for more general purposes.

BACKGROUND OF THE INVENTION

Pomegranates have been grown since ancient times and are mentioned in the Bible. Marketing thereof in the economically advanced countries of the world is extremely limited and the fruit is virtually unknown in many of these countries except perhaps for purposes of decoration during holiday seasons.

Popular acceptance of pomegranates as a convenience or snack food has not been realized for a number of reasons. The fruit must be taken apart, i.e. the flesh bearing seeds must be separated from the exterior of the fruit and from the internal partitions in the fruit, both of which are inedible. This is not a particularly simple task and cannot be done without the use of a tool, such as a knife. Furthermore, the juice of the pomegranate is known to produce permanent stains on clothing.

Up to the present no commercially acceptable technique for mechanically separating pomegranate seeds from the remainder of the fruit has been found. Manual separation of the pomengranate seeds for marketing of the seeds in a ready-to-eat state has been found to be economically unfeasible.

A further difficulty with marketing pomegranate seeds in a ready-to-eat state is the extremely short shelf life of the seeds in a fresh state once separated.

SUMMARY OF THE INVENTION

The present invention seeks to overcome the present limitations which prevent marketing of pomegranate seeds in a fresh, separated, ready-to-eat state.

There is thus provided in accordance with an embodiment of the present invention apparatus for mechanical separation of the seeds of pomegranates or similar produce comprising a gas jet directed on the portion of the produce to be separated for effecting the desired separation.

Further in accordance with an embodiment of the invention there is provided apparatus for mechanical separation of parts of produce from each other comprising apparatus for exposing the interior of the produce, apparatus for supporting the produce such that its interior is exposed and a gas jet arranged so as to direct a flow of pressurized gas against the exposed interior of the produce thereby effecting the desired separation.

Additionally in accordance with an embodiment of the present invention there is provided apparatus for moving the gas jet in a scanning motion such that the flow of pressurized gas scans the entire surface of the exposed interior of the produce.

Additionally in accordance with an embodiment of the present invention the moving apparatus comprises apparatus for changing the angular orientation of the gas jet during the scanning motion.

Further in accordance with an embodiment of the present invention, the scanning motion of the gas jet defines a Lissajous figure.

Still further in accordance with an embodiment of the present invention there is provided scanning apparatus comprising a frame supporting a scanning element, gear apparatus arranged to be coupled to a source of rotational energy and providing first and second rotational outputs about different axes; and apparatus for coupling the first and second rotational outputs to the frame for moving the frame about axes parallel to the first and second axes in pivotal motion, the combined pivotal motions of the frame causing the scanning element to undergo a scanning movement defined by the first and second rotational outputs.

Additionally in accordance with an embodment of the present invention there is provided a technique of preserving separated pomegranate seeds in a fresh state comprising the step of maintaining the pomegranate seeds in a modified atmosphere and at a temperature of about 0° C.

BRIEF DESCRIPTION OF THE DRAWINGS

The present invention will be more fully understood and appreciated from the following detailed description taken in conjunction with the drawing in which.

DETAILED DESCRIPTION OF THE INVENTION

Figure 1A:
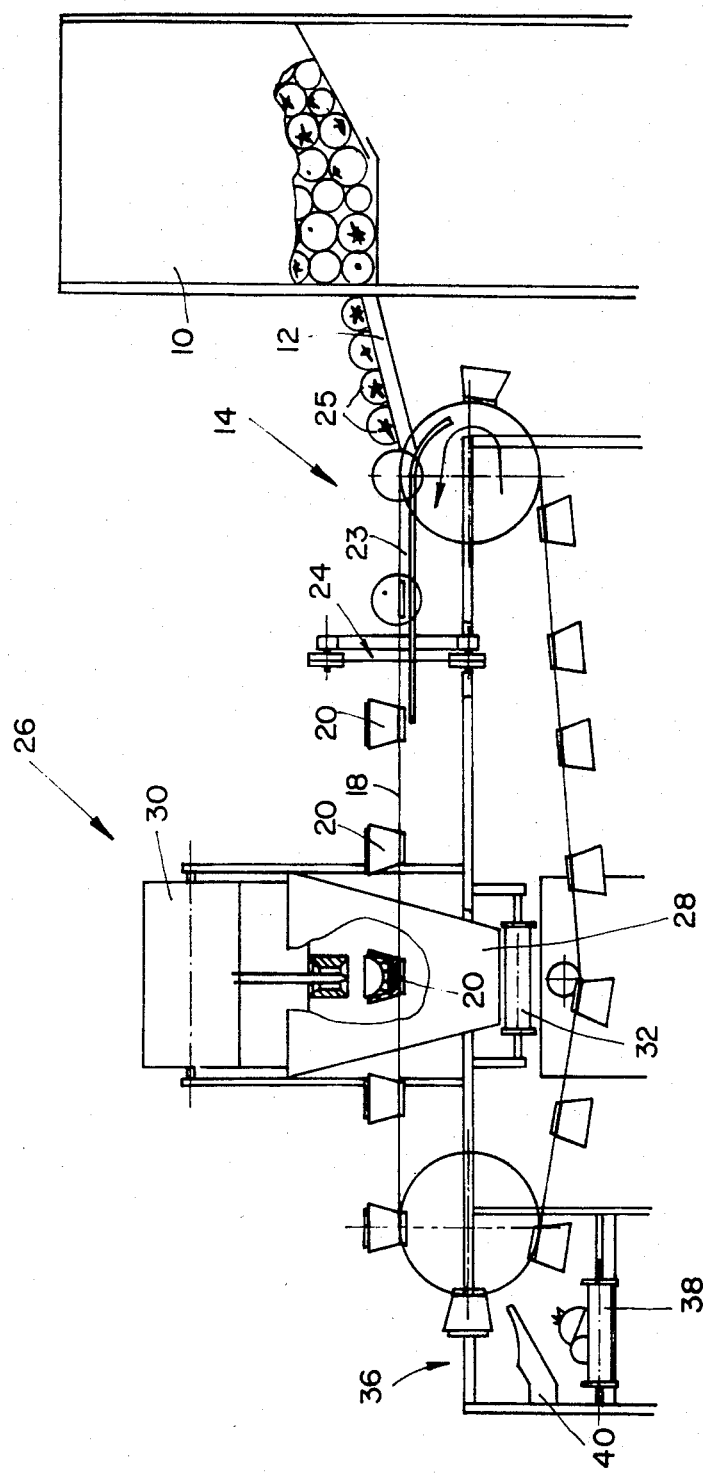
FIG. 1A and FIG. 1B are respective side view and top view illustrations of separating apparatus constructed and operative in accordance with an embodiment of the present invention.
Figure 1B:
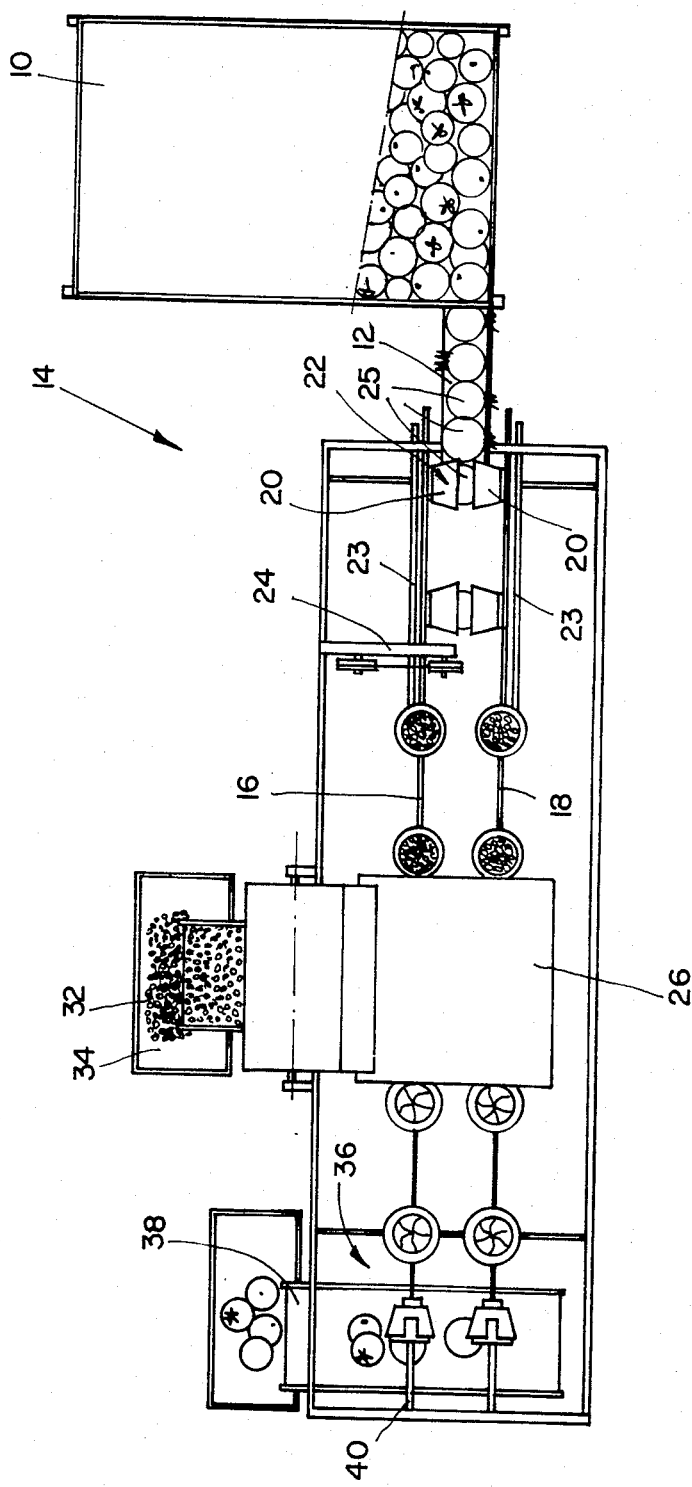

Reference is now made to FIGS. 1A and 1B which illustrate one embodiment of the present invention in the context of separation of pomegranates. It will be appreciated that a number of other embodiments are suitable such as the use of horizontal or vertical carousel for handling the fruit, rather than the conveyor as illustrated. It will be further appreciated that the presently described apparatus may be useful for separation of other types of produce as well as pomegranates.

In the illustrated embodiment, a supply of fresh pomegranates is stored in a supply bin 10. A single row of pomegranates proceeds along a slide or conveyor 12 into engagement with a dual cup engagement conveyor assembly 14. Conveyor assembly 14 comprises a pair of endless conveyor belts 16 and 18 onto which are mounted at predetermined intervals cup members 20. The cup members 20 mounted onto conveyor belts 16 and 18 are arranged in facing pairs.

Conveyor assembly 14 is constructed such that cup members 20 may assume two possible orientations. Their normal orientation is with their opening in a horizontal plane as seen in FIG. 1A over most of the rotation cycle beginning from output end of slide or conveyor 12, the cup members 20 are rotated by 90° so as to have their openings facing each other and to lie in spaced relationship, as seen in FIG. 1B at reference numeral 22.

The 90° rotation of the cup members 20 on both conveyor belts 16 and 18 is produced by suitable cam members 23 which may be spring loaded or otherwise adjustable in order to provide a selectable or automatically adjustable spacing between the two facing cup members. It may be appreciated that at the portion of the conveyor assembly rotation cycle at which the cup members are in facing spaced relationship as seen at reference numeral 22, each pair of facing cup members encloses a pomegranate 25. The selectable spacing between the facing cup members is provided in order to accomodate different sizes of pomegranates.

The rotation of the conveyor assembly 14 proceeds in a counterclockwise sense as seen in FIG. 1A, thus bringing individual pomegranates, each cupped by facing cup members 20, to a vertical cutter 24, which may be any suitable cutting element oriented on a vertical axis and which is arranged to pass between the facing spaced cup members 20. The cutter 24 is operative to cut the pomegranate into halves.

Once the cup members containing the pomegranate pass the cutter 24, the cup members 20 are permitted to reassume their normal orientation having their openings lying in a horizontal plane, and thus orienting the pomegranate halves, each having an exposed generally planar inner surface lying upward in a horizontal plane. The cup members 20 containing the pomegranate halves thus oriented are then supplied to a separation chamber 26.

Separation chamber 26, which will be described hereinafter in greater detail, comprises a bin-type housing 28 and a scanning gas jet assembly 30 disposed thereabove and in operative engagement with the pomegranate halves for separating the individual pomegranate seeds from the remainder of the pomegranate by means of a jet of pressurized gas, such as air, directed at the pomegranate halves. The bin-type housing 28 serves to collect the dislodged pomegranate seeds and to direct them to a pomegranate seed output conveyor 32, which transports the pomegranate seeds transversely to a collection or transport container 34. The remainder of the pomegranate halves remain in the cup members 20 and are conveyed by the conveyor belts 16 and 18 out from the separation chamber 26 to a dumping location 36 at which the pomegranate half remains are dumped onto a refuse conveyor 38. A blade 40 is provided for assisting in removal of the pomegranate half remains from the cup members 20.

Figure 2:
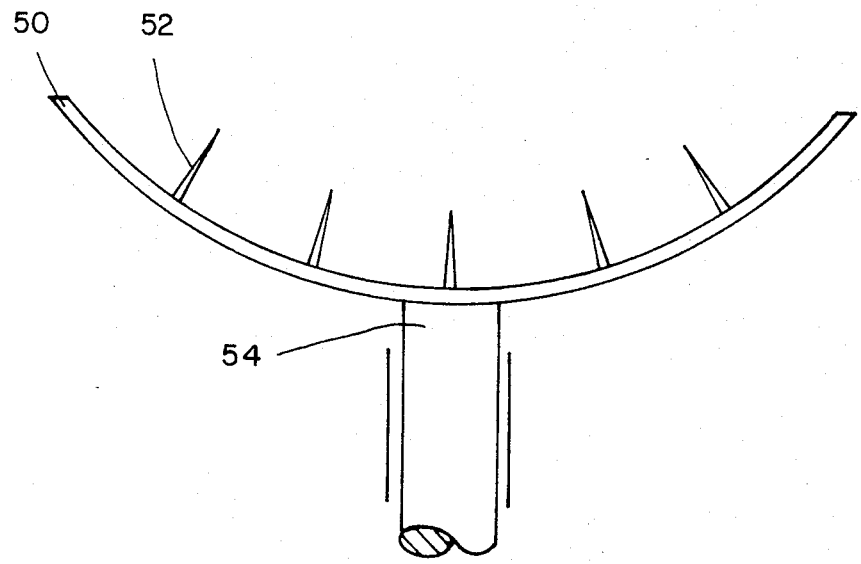
FIGS. 2 and 3 are illustrations of details of of the separating apparatus of FIGS. 1A and 1B.

Reference is now made to FIG. 2 which illustrates in a detailed vertical section the mechanism of cup members 20. Each of cup members 20 comprises a concave supporting member 50 which is movably supported onto a conveyor belt. Movably protruding into the volume defined by the concave supporting member 50 are a plurality of spikes 52 arranged in a crossed pattern to define four equal segments of a pomegranate half. In order to provide relative motion between the spikes and the concave supporting member, one or the other of spikes and concave supporting member 50 may be mounted on an automatically movable member, such as a piston or an electromagnet. Engagement of spikes with the pomegranate when the pomegranate is securely held between two facing cup members effectively breaks the pomegranate halves into segments, thus facilitating pomegranate seed separation. In the illustrated embodiment, the concave supporting member 50 is mounted on a pneumatically operated piston 54, which is, in turn, supported onto the conveyor belt.

Figure 3:
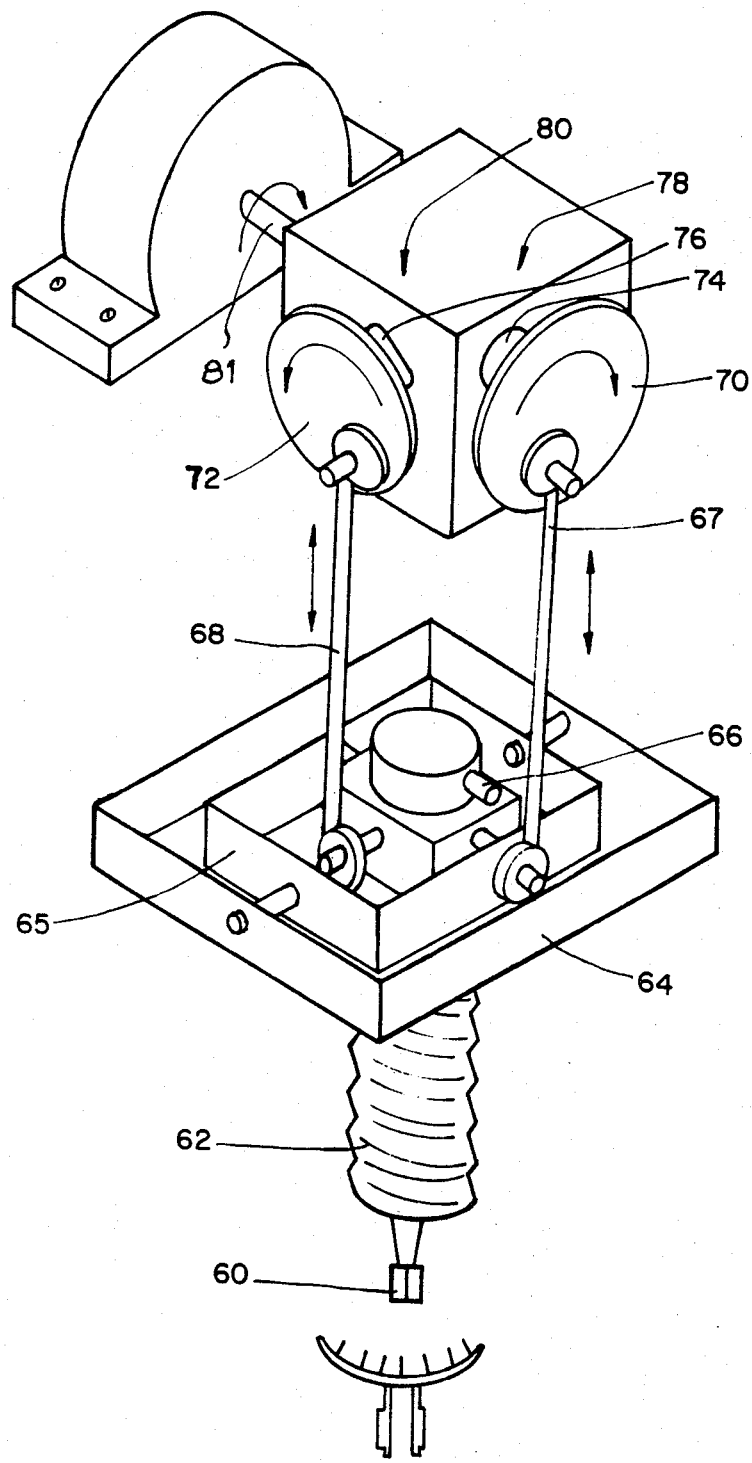

Reference is now made to FIG. 3 which illustrates apparatus for separating pomegranate seeds from pomegranates which is employed in the apparatus of FIGS. 1A and 1B. The apparatus comprises a nozzle 60, typically having an outlet diameter of 3 mm which is resiliently coupled by means of a corrugated gas conduit 62 to a supporting frame. Pressurized gas, typically air at a pressure of 5 At. is provided by means of a compressor 66 associated with the apparatus or by an appropriate external source of pressurized gas.

The nozzle 60 and frame 64 are supported onto a selectably orientatable frame 65 which is in turn suspended, in a slidable manner, on reciprocating shafts 67 and 68. It may be appreciated that the relationship between the phase and frequencies of reciprocation of shafts 67 and 68 determines the pattern which a stream of pressurized gas defines on a plane lying below nozzle 60.

Shafts 67 and 68 are in turn pivotably coupled onto rotating disks 70 and 72, which are in turn coupled to rotating shafts 74 and 76. Shafts 74 and 76 may in turn be coupled to bevel gears 78 and 80, the ratio of whose teeth may determine the frequency relationship between the reciprocation of shafts 67 and 68. One of the bevel gears is coupled to a rotating energy source 81.

Figure 4:
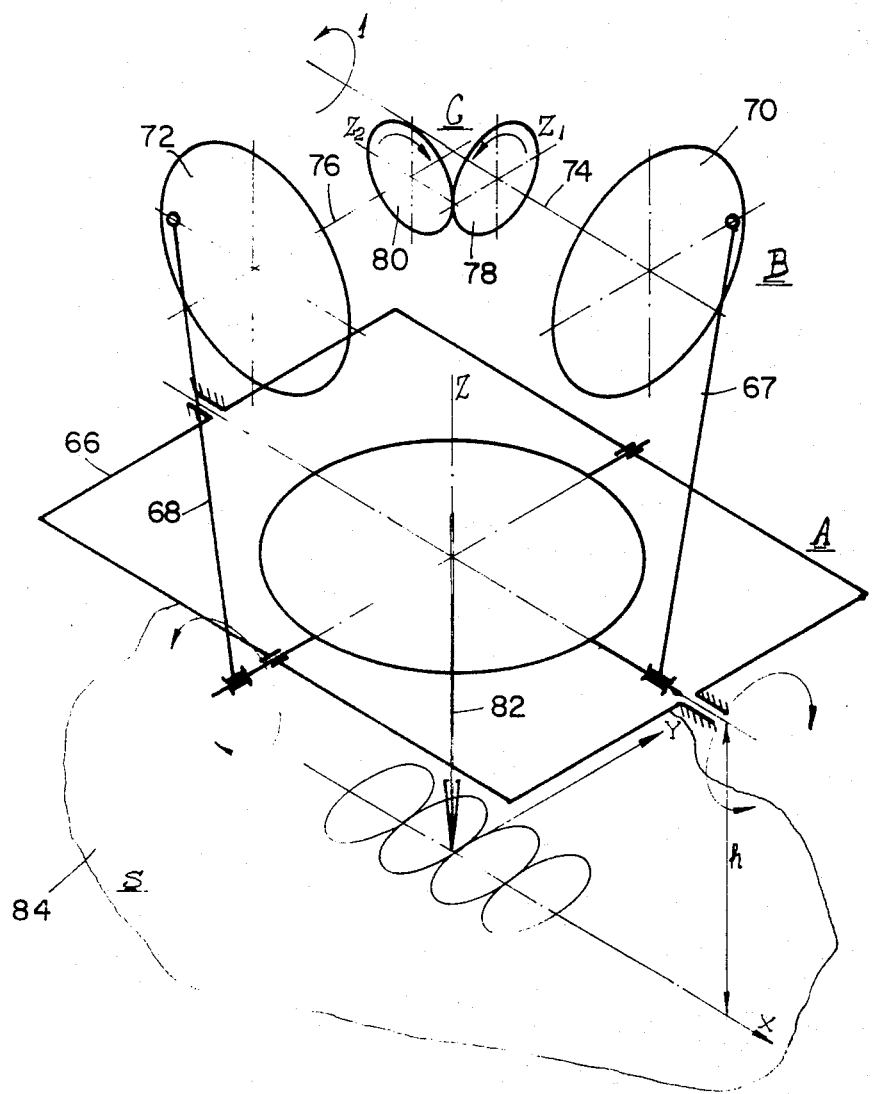
FIG. 4 is a schematic illustration of the apparatus of FIG. 3 in a general form illustrating the principle of operation thereof.

The operation of the apparatus of FIG. 3 will be more fully appreciated from a consideration of FIG. 4 which illustrates scanning apparatus constructed and operative in accordance with an embodiment of the present invention and forming the basis for the apparatus of FIG. 3. For convenience, the reference numerals employed in FIG. 3 are used also in FIG. 4 for parts having the same function. It may be appreciated from a consideration of FIG. 4 that an arrow 82 defining the normal to the plane defined by frame 65 will define a figure on a plane 84 lying therebelow. The configuration of the figure is a function of the phase and frequency relationship between the reciprocation of shafts. Where the two frequencies are not multiples of each other, a Lissajous figure results, resulting in a scanning motion over a predetermined portion of the plane, in which substantially the entire portion of the plane is systematically scanned within a predetermined period of time.

It may be appreciated from a consideration of FIGS. 3 and 4 that nozzle 60 is operative to scan the entire exposed interior surface of a halved pomegranate within a known predetermined time, thus producing a stream of pressurized gas, typically at a separation of 4 cm from the nozzle outlet to the pomegranate surface, for separation of the pomegranate seeds from the fruit without causing appreciated damage to the pomegranate seeds. The seeds, thus dislodged, fall onto the collection bin type housing 28 which is suitably padded to minimize bruising. The travel of the nozzle in its scanning motion is such that the nozzle is oriented at a wide variety of angular orientations thus enhancing disengagement of the pomegranate seeds from the remainder of the fruit.

It is also appreciated that the scanning apparatus, of which the apparatus shown in FIGS. 3 and 4 is an example, may be used for various other applications unrelated to fruit or produce separation and not limited to the application of a gas stream.

Once the pomegranate seeds have been separated from the remainder of the fruit, it is necessary to transport and store the seeds refrigerated while preserving them in their fresh state. In accordance with the present invention, storage and transport of the pomegranate seeds is effected in a modified atmosphere having limited $O_2$ and $CO_2$ composition which ensures freshness for a long storage period (for 3-4 months).

In experiments conducted during three years by the applicants, the results of storage of the pomegranate seeds were as follows: a durable fresh natural state during 3–4 months, and two weeks of shelf life when marketed and used, without using any chemicals.

It may be appreciated that the storage of the pomegranate seeds was in the natural form, without the use of additivies. However, different composition of gases or coating with edible substances to lengthen the shelf life and preserve texture, color and taste should not be ruled out.

It will be appreciated by persons skilled in the art that the present invention is not limited by what has been particularly shown and described hereinabove. Rather the scope of the present invention is defined only by the claims which follow:

We claim:

1. Apparatus for separation of individual pomegranate seeds from the remainder of a pomegranate comprising:
   means, having two degrees of freedom for directing a pressurized jet of gas onto the exposed surface of the interior of a pomegranate, thereby scanning the exposed surface with said pressurized jet at varying angular orientations, said means comprising:
   a nozzle arranged to be coupled to a source of pressurized gas;
   a frame supporting said nozzle and defining first and second rotational axes; and
   means for providing simultaneous rotation of said frame about said first and second rotational axes at first and second frequencies which are not mutliples of each other.

2. Apparatus according to claim 1 and wherein said first and second rotational axes comprise mutually perpendicular axes.

3. Apparatus according to claim 1 and also comprising means for exposing the interior of said pomegranate:
   first and second endless conveyor belts;
   a plurality of cup members arranged in predetermined spaced arrangement long said first and second endless conveyor belts;
   means for causing first and second cup members on said first and second endless conveyor means to engage a pomegranate therebetween and to lie in facing spaced pomegranate engaging relationship;
   cutting means for slicing said pomegranate while it is held between said first and second cup members; and
   means for orienting said first and second cup members, each containing a portion of said pomegranate after passing said cutting means, into an upstanding orientation whereby the interior of said produce is exposed.

4. Apparatus according to claim 3 and wherein said cup members each comprise a generally concave support member and a plurality of spikes which are retractably mounted with respect to said concave support member for selectable engagement with a pomegranate supported thereby.

* * * * *